United States Patent
Kawamoto et al.

(10) Patent No.: US 10,295,926 B2
(45) Date of Patent: May 21, 2019

(54) IMAGE FORMING APPARATUS

(71) Applicant: CANON KABUSHIKI KAISHA, Tokyo (JP)

(72) Inventors: Takahiro Kawamoto, Yokohama (JP); Kazuhiro Okubo, Kawasaki (JP); Yuji Kawaguchi, Inagi (JP); Masanori Tanaka, Yokohama (JP); Jun Miura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/019,388

(22) Filed: Jun. 26, 2018

(65) Prior Publication Data

US 2019/0018337 A1     Jan. 17, 2019

(30) Foreign Application Priority Data

Jul. 14, 2017   (JP) ................. 2017-138420

(51) Int. Cl.
  *G03G 15/02*   (2006.01)
  *G06F 3/12*    (2006.01)
  *G03G 15/16*   (2006.01)
  *G03G 15/00*   (2006.01)

(52) U.S. Cl.
  CPC ....... *G03G 15/0225* (2013.01); *G03G 15/161* (2013.01); *G03G 15/80* (2013.01); *G06F 3/126* (2013.01)

(58) Field of Classification Search
  CPC .. G03G 15/0225; G03G 15/161; G03G 15/80; G06F 3/126
  See application file for complete search history.

(56) References Cited

U.S. PATENT DOCUMENTS

| | | | | |
|---|---|---|---|---|
| 6,256,462 B1 * | 7/2001 | Maeda | ............... | G03G 15/0105 |
| | | | | 399/149 |
| 6,987,939 B2 * | 1/2006 | Ishiyama | ............. | G03G 15/0225 |
| | | | | 399/129 |
| 7,657,215 B2 * | 2/2010 | Yamazaki | .......... | G03G 15/5004 |
| | | | | 399/327 |

FOREIGN PATENT DOCUMENTS

| | | |
|---|---|---|
| JP | 2001194951 A | 7/2001 |
| JP | 4798854 B2 | 10/2011 |

* cited by examiner

*Primary Examiner* — Gregory H Curran
(74) *Attorney, Agent, or Firm* — Canon U.S.A., Inc. IP Division

(57) ABSTRACT

An image forming apparatus using a contact charging method includes a control unit capable of executing cleaning in a post-rotation step at the end of a job and in an inter-image step during execution of the job. The cleaning involves moving toner adhering to a charging member from the charging member to an image bearing member. The job is a series of operations started by a predetermined start instruction and involving forming an image on one or more recording materials and outputting the one or more recording materials. When an instruction to start the next job is input during execution of cleaning in the post-rotation step, the control unit stops the cleaning in the middle of the execution, starts the next job, and adjusts timing for executing subsequent cleaning on the basis of information. relating to the amount of cleaning executed before being stopped in the middle of the execution.

12 Claims, 6 Drawing Sheets

IMAGE FORMING APPARATUS

BACKGROUND OF THE INVENTION

Field of the Invention

The disclosure relates to an image forming apparatus, such as a copier, a printer, or a facsimile machine, using an electrophotographic method or an electrostatic recording method.

Description of the Related Art

In an image forming apparatus using an electrophotographic method or the like, a "contact charging method" that applies a voltage to a charging member in contact with an image bearing member (e.g., photosensitive member) is used as a method for charging the surface of the image bearing member. The contact charging method is advantageous in that it produces less ozone and consumes less power than a method that uses a corona charger.

Examples of the image forming apparatus using an electrophotographic method or the like include one that uses a "cleaner-less method". The cleaner-less method is characterized in that the apparatus does not include a cleaning device that is specifically designed to remove residual toner remaining on the surface of the image bearing member after transfer of a toner image from the image bearing member to a receiving member. In the "cleaner-less" image forming apparatus, residual toner on the surface of the image bearing member is collected by a developing device, or by a cleaning device specifically designed for another image bearing member (e.g., intermediate transfer member) after transfer to this image bearing member. The cleaner-less method is advantageous in that it reduces costs, because it requires no dedicated space for storage of collected toner around the image bearing member, reduces the size of the apparatus, and enables omission of some components.

However, using the contact charging method or, in particular, using both the contact charging method and the cleaner-less method, may cause toner to adhere to and accumulate on the charging member, through repetition of image formation and various control operations for image stabilization. This is because a potential difference between the charging member and the image bearing member causes part of residual toner on the surface of the image bearing member to electrostatically adhere to the charging member. This may alter the charging capability of the charging member, make the charging member unable to uniformly charge the surface of the image bearing member, and cause variations in image density.

A method that executes cleaning in a post-rotation step of a job, as described in Japanese Patent Laid-Open No. 2001-194951, is known. In this cleaning, toner adhering to the charging member is moved (discharged) from the charging member to the image bearing member. Executing this cleaning can prevent an excessive amount of toner from accumulating on the charging member. Japanese Patent No. 4798854 proposes a method which determines the duration of cleaning performed after interruption of a job, on the basis of the value of image density accumulated since the beginning of the job and the number of sheets with images formed thereon after cleaning following the previous job interruption.

In the related art, once cleaning is started, even when an instruction to start the next job is input to the image forming apparatus during the cleaning, the next job is not started until completion of the cleaning. In particular, execution of cleaning in the post-rotation step of a job takes place many times because the cleaning is typically executed in the post-rotation step of each job. This takes longer if many high-density images are output. Therefore, once cleaning in the post-rotation step of a job is started, the length of waiting time before start of the next job may be long.

SUMMARY OF THE INVENTION

Accordingly, the disclosure provides an image forming apparatus that can maintain productivity of image formation while executing cleaning to prevent accumulation of an excessive amount of toner on the charging member.

An image forming apparatus according to an aspect of the disclosure includes an image bearing member configured to bear a toner image thereon, a charging member configured to contact and charge the image bearing member, a developing member configured to supply toner to the image bearing member, and a control unit configured to execute cleaning involving moving the toner adhering to the charging member from the charging member to the image bearing member. When an instruction to start the next job is input during execution of the cleaning, the control unit stops the cleaning, starts the next job, and controls timing for executing the next cleaning on the basis of information relating to the cleaning executed before being stopped.

Further features and aspects of the disclosure will become apparent from the following description of multiple example embodiments with reference to the attached drawings.

DESCRIPTION OF THE EMBODIMENTS

An image forming apparatus according to embodiments of the disclosure will now be described in detail with reference to the drawings.

First Example Embodiment

1. General Configuration and Operation of Image Forming Apparatus

Figure 1:
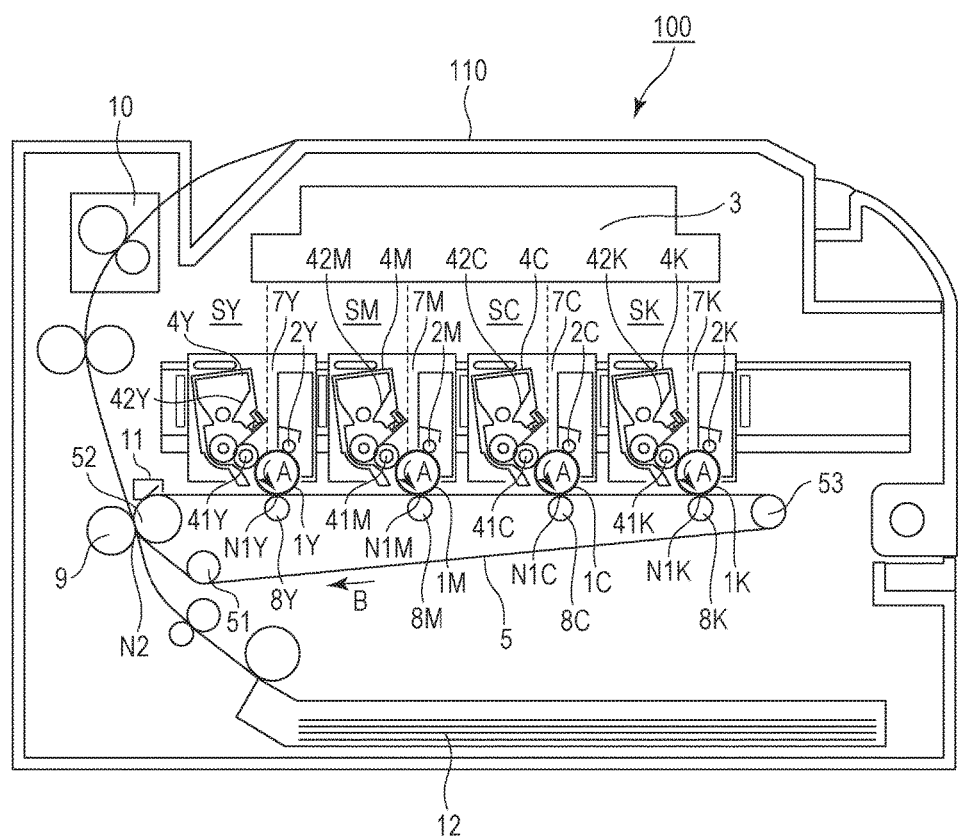
FIG. 1 is a schematic cross-sectional view of an example image forming apparatus.

FIG. 1 is a schematic cross-sectional view of an example image forming apparatus 100 according to a first embodiment. The image forming apparatus 100 of the present embodiment is an electrophotographic full-color laser printer (color image forming apparatus) using an in-line intermediate transfer method. The image forming apparatus 100 is capable of forming a full-color image on a recording material 12 (e.g., recording sheet, plastic sheet, or cloth) in accordance with image information. The image information is input to an apparatus main body 110 from an external device (e.g., image reading apparatus or personal computer) connected to the image forming apparatus 100 in such a manner that it can communicate therewith.

The image forming apparatus 100 includes a plurality of image forming units, that is, first, second, third, and fourth image forming units (stations) SY, SM, SC, and SK for forming images of different colors, yellow (Y), magenta (M), cyan (C), and black (K), respectively. Note that elements provided for the respective colors and having the same or corresponding functions or configurations, may be collectively described without using the suffixes Y, M, and K for identifying these colors. In the present embodiment, the image forming unit S includes a photosensitive drum 1, a charging roller 2, a scanner unit 3, a developing device 4, and a primary transfer roller 8 (described below).

The image forming apparatus 100 includes the photosensitive drum 1 which is a drum-type (cylindrical) electrophotographic photosensitive member serving as a rotatable image bearing member that bears a toner image thereon. In the present embodiment, four photosensitive drums 1Y, 1M, 1C, and 1K are arranged side by side along a direction (substantially horizontal in the present embodiment) intersecting the vertical direction. In the present embodiment, the photosensitive drum 1 includes a photosensitive layer produced by coating an aluminum drum base with an undercoat layer, a carrier generation layer, and a carrier transfer layer, which are functional films, formed in this order. The photosensitive drum 1 is rotationally driven by a drive source (not shown) in the direction of arrow A (counterclockwise) in the drawing at a predetermined circumferential velocity (processing speed). In the present embodiment, the photosensitive drum 1 is a negatively charged organic photosensitive drum having a diameter of 24 mm and rotationally driven at circumferential velocity of 100 mm/second.

The surface of the rotating photosensitive drum 1 is uniformly charged to a predetermined potential of a predetermined polarity (negative in the present embodiment) by the charging roller 2, which is a roller-type charging member (contact charging member) serving as a charging unit. The charging roller 2 contacts the surface of the photosensitive drum 1 with predetermined contact pressure. By friction with the surface of the photosensitive drum 1, the charging roller 2 rotates as the photosensitive drum 1 rotates. In the charging step, a charging voltage (charging bias), which is a direct-current voltage of a predetermined polarity, is applied from a charging power supply (high-voltage power supply circuit) 20 (see FIG. 2) to the charging roller 2. In the present embodiment, the charging voltage is a direct-current voltage of −1000 V. In the present embodiment, the surface potential of the photosensitive drum 1 charged by applying the charging voltage to the charging roller 2 was about −450 V when measured with a surface electrometer, Model 344, manufactured by Trek, Inc. For example, a roller produced by forming an elastic layer on a metal core (supporting member) may be used as the charging roller 2. The elastic layer may be made of resin or rubber. Typically, a medium-resistance layer formed by a foamed elastic body may be used as the elastic layer. The medium-resistance layer may contain resin, conductive particles (e.g., carbon black particles), sulfating agent, or foaming agent, and may be surface-ground after being formed into a roller shape on the metal core. In the present embodiment, a roller produced by forming a medium-resistance layer of urethane resin on a metal core is used as the charging roller 2.

The charged surface of the photosensitive drum 1 is subjected to scanning exposure (image exposure) by the scanner unit (exposure device) 3 serving as an exposure unit. This produces an electrostatic image (electrostatic latent image) on the surface of the photosensitive drum 1. The scanner unit 3 outputs laser light in accordance with image information input from the external device, so as to irradiate the surface of the photosensitive drum 1. The electrostatic image formed on the surface of the photosensitive drum 1 is developed (or visualized) by the developing device 4 (developing member) using toner (developing agent). A toner image is thus formed on the surface of the photosensitive drum. In the present embodiment, the toner image is formed by exposure of an image portion and reversal development. That is, in the present embodiment, after the surface of the photosensitive drum 1 is uniformly charged, toner charged with the same polarity (negative in the present embodiment) as the charging polarity of the photosensitive drum 1 adheres to a portion (image portion or exposure portion) where the absolute value of the potential is reduced by exposure. Thus, the present embodiment, the normal charging polarity of toner, which is the charging polarity of toner during development, is negative. The developing device 4 will be further described later on.

An intermediate transfer belt 5 formed by an endless belt, which serves as an intermediate transfer member (receiving member), is disposed to face the four photosensitive drums 1Y, 1M, 1C, and 1K. The intermediate transfer belt 5 serves as another image bearing member that bears and conveys a toner image transferred from the photosensitive drum 1 (image bearing member), so as to further transfer the toner image to the recording material 12. The intermediate transfer belt 5 is stretched over a driven roller 51, a secondary transfer counter roller 52, and a driving roller 53 (i.e., a plurality of stretching rollers) under a predetermined tension. As the driving roller 53 is rotationally driven by the drive source (not shown), the intermediate transfer belt 5 circularly runs in the direction of arrow B (clockwise) in the drawing at the same circumferential velocity as the photosensitive drum 1. On the inner surface of the intermediate transfer belt 5, the primary transfer roller 8, which is a roller-type primary transfer member serving as a primary transfer unit, is disposed opposite each photosensitive drum 1. The primary transfer roller 8 is pressed against the corresponding photosensitive drum 1, with the intermediate transfer belt 5 interposed therebetween, to form a primary transfer portion N1 at which the intermediate transfer belt 5 and the photosensitive drum 1 are in contact. The toner image formed on the surface of the photosensitive drum 1, as described above, is transferred (primary-transferred) at the primary transfer portion N1 to the surface of the intermediate transfer belt 5 by action of the primary transfer roller 8. In the primary transfer step, a primary transfer voltage (primary transfer bias), which is a direct-current voltage of a polarity opposite the normal charging polarity of toner, is applied from a primary transfer power supply (high-voltage power supply circuit) 22 (see FIG. 2) to the primary transfer roller 8. For example, for forming a full-color image, toner images of yellow, magenta, cyan, and black, each formed on the surface of the corresponding photosensitive drum 1, are sequentially primary-transferred onto the surface of the intermediate transfer belt 5 in such a manner that they are superimposed on one another.

On the outer surface of the intermediate transfer belt 5, the secondary transfer roller 9, which is a roller-type secondary transfer member serving as a secondary transfer unit, is disposed opposite the secondary transfer counter roller 52. The secondary transfer roller 9 is pressed against the secondary transfer counter roller 52, with the intermediate transfer belt 5 interposed therebetween, to form a secondary transfer portion N2 at which the intermediate transfer belt 5 and the secondary transfer roller 9 are in contact. By action of the secondary transfer roller 9, the toner image formed on the surface of the intermediate transfer belt 5, as described above, is transferred (secondary-transferred) at the secondary transfer portion N2 to the surface of the recording material 12 conveyed while being sandwiched between the intermediate transfer belt 5 and the secondary transfer roller 9. In the secondary transfer step, a secondary transfer voltage (secondary transfer bias), which is a direct-current voltage of a polarity opposite the normal charging polarity of toner, is applied from a secondary transfer power supply (high-voltage power supply circuit) 23 (see FIG. 2) to the secondary transfer roller 9. By a feeding device, the recording material 12 is fed to the secondary transfer portion N2 in synchronization with conveyance of the toner image on the surface of the intermediate transfer belt 5.

The recording material 12 having the toner image transferred thereto is conveyed to a fixing device 10 serving as a fixing unit, where the toner image is fixed (secured) onto the recording material 12 by being subjected to heat and pressure. The recording material 12 is then discharged (output) from the apparatus main body 110 of the image forming apparatus 100.

A primary transfer residual toner remaining on the surface of the photosensitive drum 1, without being primary-transferred to the surface of the intermediate transfer belt 5, is conveyed to a contact portion between the photosensitive drum 1 and the charging roller 2 as the photosensitive drum 1 rotates. At this contact portion, a potential difference between the charging roller 2 and the photosensitive drum 1 causes part of the primary transfer residual toner on the surface of the photosensitive drum 1 to adhere to, and to be collected on, the surface of the charging roller 2. The remaining primary transfer residual toner on the surface of the photosensitive drum 1 is conveyed to a contact portion between the photosensitive drum 1 and a developing roller 41 (described below) of the developing device 4 as the photosensitive drum rotates. At this contact portion, by a potential difference between the developing roller 41 and the photosensitive drum 1, part of the remaining primary transfer residual toner on the surface of the photosensitive drum 1 is collected on the developing roller 41 and returned into the developing device 4, whereas the rest is used for the next development together with toner on the developing roller 41. Thus, in the present embodiment, development and cleaning of the photosensitive drum 1 are carried out at the same time. That is, in the present embodiment, toner remaining on the photosensitive drum 1 after transfer of the toner image from the photosensitive drum 1 onto the intermediate transfer belt 5 can be collected by the developing device 4.

On the outer surface of the intermediate transfer belt 5, a belt cleaning device 11 serving as an intermediate transfer member cleaning unit is disposed downstream of the secondary transfer portion N2 and upstream of a primary transfer portion N1Y at the most upstream position, in the direction of travel of the surface of the intermediate transfer belt 5. In the present embodiment, the belt cleaning device 11 is disposed opposite the secondary transfer counter roller 52. A secondary transfer residual toner remaining on the surface of the intermediate transfer belt 5 without being secondary-transferred to the surface of the recording material 12 is removed from the surface of the intermediate transfer belt 5 and collected by the belt cleaning device 11. In the present embodiment, with a cleaning blade serving as a cleaning member that contacts the intermediate transfer belt 5, the belt cleaning device 11 scrapes the secondary transfer residual toner off the surface of the running intermediate transfer belt 5 and collects it in a cleaning container.

The image forming apparatus 100 is also capable of forming a single-color or multi-color image using only one or more (not all) image forming units S.

In the present embodiment, the photosensitive drum 1 is combined with the charging roller 2 and the developing device 4, which serve as a processing unit configured to act on the photosensitive drum 1, to form a process cartridge 7, which is detachable from the apparatus main body 110 of the image forming apparatus 100. The process cartridge 7 is detachably mounted to the apparatus main body 110 through a mounting unit, including a mounting guide and a positioning member, disposed in the apparatus main body 110. In the present embodiment, the process cartridges 7 for the respective colors have substantially the same shape.

The image forming apparatus 100 performs a job (print job) which is a series of operations started by a predetermined start instruction (start signal) and involving forming an image on one or more recording materials 12 and discharging (outputting) the one or more recording materials 12 from the apparatus main body 110 of the image forming apparatus 100. The job typically includes an image forming step, a pre-rotation step, an inter-sheet step (inter-image step) performed when an image is formed on a plurality of recording materials 12, and a post-rotation step. The image forming step corresponds to a period during which formation of an electrostatic image, formation of a toner image, primary and secondary transfer of the toner image, and fixing of the toner image are performed. Technically, the timing of the image forming step varies depending on the position at which each of the steps (e.g., charging, exposure, development, primary transfer, secondary transfer, and fixing) takes place. The pre-rotation step corresponds to a period during which a preparatory operation preceding the image forming step is performed. The inter-sheet step corresponds to a period or interval between successive recording materials 12 at the secondary transfer portion N2 when the image forming step is continuously performed on a plurality of recording materials 12. The post-rotation step corresponds to a period during which a cleanup operation (preparatory operation) following the image forming step is performed. The period of the image forming step described above is referred to as an image forming period. The period outside the image forming period is referred to as a non-image-forming period. The non-image-forming period includes the periods of the pre-rotation step, inter-sheet step, and post-rotation step described above.

2. Developing Device

In the present embodiment, the developing device 4 uses a nonmagnetic one-component developing agent (toner) as a developing agent. The developing device 4 includes a developer container 42 containing toner, and the developing roller 41 serving as a developing agent bearing member and attached to the developer container 42 in such a manner as to face the photosensitive drum 1. The developer containers 42 of the developing devices 4Y, 4M, 4C, and 4K for the respective colors contain toners of yellow (Y), magenta (M), cyan (C), and black (K).

The volume mean particle size of the toner may range from 5 μm to 10 μm. The volume mean particle size of the toner can be measured with a precise particle size distribution measuring device, Multisizer 3, manufactured by Beckman Coulter, Inc. Inorganic particles may be externally added to the toner particles for modifying the surface properties of the toner particles. Examples of the inorganic particles include particles of silica, alumina, silicon oxide, titanium oxide, aluminum oxide, barium titanate, magnesium titanate, calcium titanate, strontium titanate, zinc oxide, tin oxide, silica sand, clay, mica, wollastonite, diatomaceous earth, chromium oxide, ceric oxide, colcothar, antimony trioxide, magnesium oxide, zirconium oxide, barium sulfate, barium carbonate, calcium carbonate, silicon carbide, and silicon nitride. One or a combination of more than one of these types may be used. A surface layer made of one or more inorganic materials may be formed as the surface of a toner particle, or inorganic microparticles may be attached to the surface of a toner particle. In the present embodiment, a negatively charged nonmagnetic toner produced by suspension polymerization and having a volume mean particle size of about 6.5 μm is used as the toner. Also, in the present embodiment, silicon oxide particles and titanium oxide particles weighing about 1.5% and about 0.1%, respectively, of toner weight and having a volume mean particle size of about 20 nm, are substantially uniformly attached to the surfaces of toner particles. Although the toner produced by suspension polymerization is used in the present embodiment, the toner is not limited to this. For example, a toner produced by pulverization or another polymerization method, such as emulsion polymerization, may be used.

The developing roller 41 conveys toner on the surface thereof to a location facing the photosensitive drum 1, causes the toner to adhere to the surface of the photosensitive drum 1 in accordance with an electrostatic image formed on the surface of the photosensitive drum 1, and develops (visualizes) the electrostatic image. In the present embodiment, the developing roller 41 is configured to be movable toward and away from the photosensitive drum 1. That is, the image forming apparatus 100 includes a contact and separation mechanism 24 (see FIG. 2) serving as a contact and separation unit that controls the contact/separation state of the developing roller 41 and the photosensitive drum 1. Generally, the contact and separation mechanism 24 brings the developing roller 41 into contact with the photosensitive drum 1 as necessary for the image forming step and, upon completion of this operation, separates the developing roller 41 from the photosensitive drum 1. In the present embodiment, the contact and separation mechanism 24 includes an engaging portion attached to the developer container 42 configured to be pivotable about an axis substantially parallel with the rotation axis of the photosensitive drum 1, and a moving member engaged with the engaging portion. With the moving member, the contact and separation mechanism 24 causes the developer container 42 to pivot and moves the developing roller 41 away from or toward the photosensitive drum 1. The contact and separation mechanism 24 thus changes the contact/separation state of the developing roller 41 and the photosensitive drum 1. The developing roller 41 is brought into contact with the photosensitive drum 1 over a predetermined contact width and rotationally driven by the drive source (not shown). In the present embodiment, the developing roller 41 is rotationally driven to move at a circumferential velocity higher (about 1.6 times higher in the present embodiment) than the circumferential velocity of the photosensitive drum 1 in the same direction (downward in the present embodiment) as the photosensitive drum 1 at the contact with the photosensitive drum 1. At least in the developing step, a developing voltage (developing bias), which is a direct-current voltage of a predetermined polarity (negative in the present embodiment), is applied from the developing power supply (high-voltage power supply circuit) 21 (see FIG. 2) to the developing roller 41. In the present embodiment, the developing voltage is a direct-current voltage of −300 V.

As the developing roller 41, either a single-layer or multi-layer roller may be used. Examples of the single-layer roller include one that is produced by forming an elastic layer made of an elastic material, such as rubber (e.g., silicone rubber, polyurethane rubber, or epichlorohydrin rubber) on a metal core (supporting member). Examples of the multi-layer roller include one that is produced by applying a coating of silicone resin, urethane resin, polyamide resin, or fluorocarbon resin to the surface of the elastic layer of the single-layer roller described above to form a surface layer. As the developing roller 41 of the present embodiment, a 12-mm diameter roller is used, which is produced by forming a 3-mm thick elastic layer of silicone rubber on a 6-mm diameter metal core and applying an acrylic urethane resin coating to the surface of the elastic layer to form a surface layer.

In the present embodiment, the developing device 4 performs development by allowing the developing roller 41 to come into contact with the photosensitive drum 1. However, the developing operation is not limited to this. For example, the developing device 4 may perform development, with the developing roller 41 kept close at a predetermined distance from the photosensitive drum 1.

Although a nonmagnetic one-component developing agent (nonmagnetic toner) is used as the developing agent in the present embodiment, the developing agent is not limited to this. For example, a magnetic one-component developing agent (magnetic toner) may be used as the developing agent.

3. Form of Control

Figure 2:
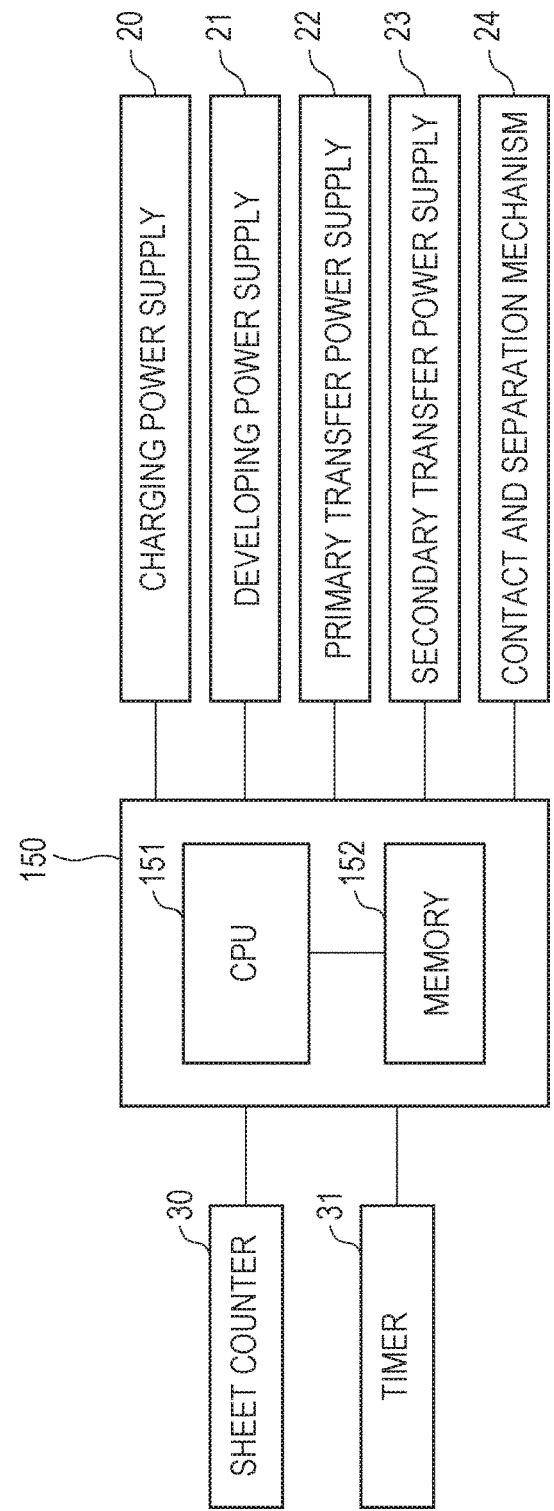
FIG. 2 is a block diagram schematically illustrating a form of control in a main part of the example image forming apparatus.

FIG. 2 is a block diagram schematically illustrating a form of control in a main part of the image forming apparatus 100 according to the present embodiment. The apparatus main body 110 of the image forming apparatus 100 includes a control unit 150 that collectively controls the operations of all parts of the image forming apparatus 100. The control unit 150 includes a central processing unit (CPU) 151 which is a central element configured to perform various computations, and a memory 152 including a read-only memory (ROM) and a random-access memory (RAM) which are storage elements. The PAM stores results of detection made by sensors, results of counting by counters, and results of computations. The ROM stores control programs and data tables experimentally obtained in advance. Components to be controlled, sensors, and counters in the image forming apparatus 100 are connected to the control unit 150. For example, the charging power supply 20, the developing power supply 21, the primary transfer power supply 22, the secondary transfer power supply 23, and the contact and separation mechanism 24 are connected to the control unit 150. A sheet counter 30 and a timer 31 are also connected to the control unit 150. The sheet counter 30 serves as a counting unit that counts the number of sheets subjected to image formation, and the timer 31 serves as a time measuring unit that counts time.

The control unit 150 controls the transmission and reception of various electrical information signals and the timing of driving each part, so as to control a predetermined image forming sequence. In the present embodiment, the control unit 150 controls the ON and OFF and the output value of each of the power supplies 20, 21, 22, and 23, and also controls the operation performed by the contact and separation mechanism 24 to control the contact/separation state of the developing roller 41 and the photosensitive drum 1, so as to execute cleaning of the charging router 2 (described below). Additionally, in the present embodiment, the control unit 150 executes interrupt processing (described below) during cleaning of the charging roller 2 using the sheet counter 30 and the timer 31.

4. Collection of Toner on Charging Roller

Collection of toner onto the surface of the charging roller 2 will now be described.

In the image forming step, part of the primary transfer residual toner, the part being charged with a polarity (positive in the present embodiment) opposite the normal charging polarity, is collected onto the surface of the charging roller 2, at the contact between the photosensitive drum 1 and the charging roller 2, by the potential difference between the charging roller 2 and the photosensitive drum 1.

In the color image forming apparatus, there is occurrence of "re-transfer" as described below. That is, part of toner of the toner image transferred onto the surface of the intermediate transfer belt 5 in the image forming unit (e.g., SM) on the upstream side in the direction of travel of the surface of the intermediate transfer belt 5, is moved to the surface of the photosensitive drum 1 when the toner image of the next color is transferred in the image forming unit (e.g., SC) on the downstream side. This "re-transferred toner" is one that is charged with a polarity (positive in the present embodiment) opposite the normal charging polarity by discharge during transfer. Therefore, in the image forming step in the color image forming apparatus, the re-transferred toner is collected onto the surface of the charging roller 2, as well as the primary transfer residual toner.

When the toner adheres to the surface of the charging roller 2 as described above, the resulting changes in the charging capability of the charging roller 2 lead to changes in the surface potential of the photosensitive drum 1. The larger the amount of toner adhering to the surface of the charging roller 2, the larger the magnitude of changes in the charging capability of the charging roller 2. Even when adhesion of toner to the charging roller 2 in one image forming step has only a limited impact on the charging capability, if an excessive amount of toner accumulates on the surface of the charging roller 2 through repetition of the image forming step, the impact of the toner accumulation on the charging capability is unignorable.

5. Cleaning of Charging Roller

Cleaning of the charging roller 2 in the present embodiment will now be described. In the present embodiment, cleaning performed in each image forming unit S is substantially the same, and cleaning in all the image forming units S is executed in a synchronized manner. The following description focuses on cleaning in one image forming unit S.

In the present embodiment, before an excessive amount of toner accumulates on the surface of the charging roller 2 and its impact on the charging capability becomes unignorable, the image forming apparatus 100 executes, at predetermined timing, cleaning which involves moving (discharging) toner from the surface of the charging roller 2 to the surface of the photosensitive drum 1. Since the relationship between the potentials of the charging roller 2 and the photosensitive drum 1 needs to differ from that during the image forming step, cleaning is executed during a non-image-forming period. In the present embodiment, the image forming apparatus 100 executes cleaning in the post-rotation step of each job.

The toner moved from the surface of the charging roller 2 to the surface of the photosensitive drum 1 in the cleaning can be collected by the developing device 4, or can be collected by the belt cleaning device 11 after being transferred at the primary transfer portion N1 onto the surface of the intermediate transfer belt 5. In the color image forming apparatus, where the toner collected onto the surface of the charging roller 2 includes toners of different colors (primary transfer residual toner and re-transferred toner), the collection performed by the developing device 4 tends to cause mixing of colors. Therefore, in the color image forming apparatus, the toner moved from the surface of the charging roller 2 to the surface of the photosensitive drum 1 in the cleaning may be collected by the belt cleaning device 11 after being transferred to the surface of the intermediate transfer belt 5 at the primary transfer portion N1.

In the present embodiment, in the period of cleaning, the developing roller 41 is separated from the photosensitive drum 1 to allow the toner moved from the surface of the charging roller 2 to the surface of the photosensitive drum 1 to pass through a location facing the developing roller 41. Also, in the present embodiment, in the period of cleaning, a voltage of a polarity (negative in the present embodiment) opposite that of the toner moved from the surface of the charging roller 2 to the surface of the photosensitive drum 1, is applied to the primary transfer roller 8 to transfer the toner to the surface of the intermediate transfer belt 5. Additionally, in the present embodiment, in the period of cleaning, a voltage of the same polarity (positive in the present embodiment) as that of the toner moved from the surface of the charging roller 2 to the surface of the photosensitive drum 1, is applied to the secondary transfer roller 9 to allow the toner to pass through the secondary transfer portion N2. Thus, the toner moved from the surface of the charging roller 2 to the surface of the photosensitive drum 1 in cleaning is collected by the belt cleaning device 11. Note that the period of cleaning described above includes at least a period during which the toner moved from the surface of the charging roller 2 to the surface of the photosensitive drum 1 passes through the location facing the developing roller 41, the primary transfer portion N1, and the secondary transfer portion N2. More specifically, the period of cleaning includes at least the following periods: a period in which the surface of the photosensitive drum 1 in contact with the charging roller 2 passes through the location facing the developing roller 41 and the primary transfer portion N1 during cleaning time Tc (described below), and a period in which the surface of the intermediate transfer belt 5 in contact with the surface of the photosensitive drum 1 passes through the secondary transfer portion N2.

Figure 3:
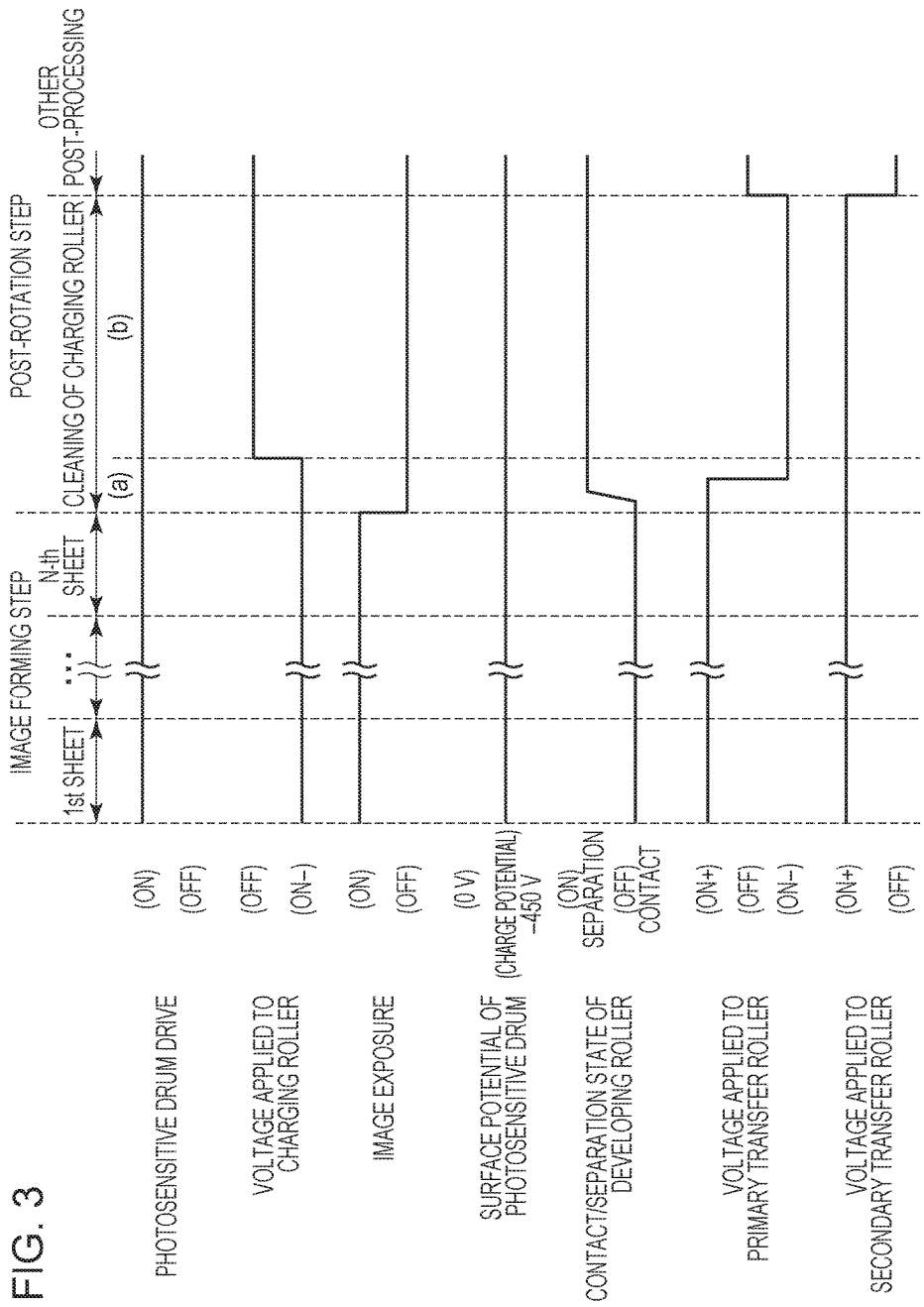
FIG. 3 is a timing diagram of cleaning.

FIG. 3 is a timing diagram for explaining cleaning executed in the post-rotation step in the present embodiment. The cleaning is executed by the control unit 150 by controlling the operation of each part of the image forming apparatus 100 at timing illustrated in FIG. 3.

During the image forming step, as described above, the primary transfer residual toner and the re-transferred toner are collected onto the surface of the charging roller 2. The toner collected on the surface of the charging roller 2 is charged with a polarity (positive in the present embodiment) opposite the normal charging polarity. During the image forming step, the potential difference between the photosensitive drum 1 and the charging roller 2 causes this toner to electrostatically adhere to, and remain on, the surface of the charging roller 2.

After image exposure ends upon completion of the image forming step for a last image (N-th sheet in FIG. 3) in a job, cleaning is executed in the post-rotation step. First, in period (a) in FIG. 3, the developing roller 41 is separated from the photosensitive drum 1. Also in period (a), voltage applied to the primary transfer roller 8 is changed from that in the image forming step to a voltage higher on the negative polarity side than the surface potential (−450 V in the present embodiment) of the photosensitive drum 1. This produces, between the photosensitive drum 1 and the intermediate transfer belt 5, an electric field in the direction in which the positively charged toner on the surface of the photosensitive drum 1 is moved to the surface of the intermediate transfer belt 5. In the present embodiment, a direct-current voltage of about −1500 V is applied at this point to the primary transfer roller 8.

Next, in period (b) in FIG. 3, that is, in the period of cleaning, a voltage applied to the charging roller 2 is changed from that in the image forming step to a voltage higher on the positive polarity side than the surface potential (—450 V in the present embodiment) of the photosensitive drum 1. This produces, between the photosensitive drum 1 and the charging roller 2, an electric field in the direction in which the positively charged toner on the surface of the charging roller 2 is moved to the surface of the photosensitive drum 1.

In the cleaning, the absolute value of the potential difference between the surface of the charging roller 2 and the surface of the photosensitive drum 1 may range from 50 V to a discharge starting voltage. If the potential difference is less than 50 V, an electric field strong enough to cause the toner to move from the surface of the charging roller 2 to the surface of the photosensitive drum 1 may not be produced. On the other hand, if the potential difference described above exceeds the discharge starting voltage between the surface of the charging roller 2 and the surface of the photosensitive drum 1, a discharge occurs between the charging roller 2 and the photosensitive drum 1. Then, part of the toner on the surface of the charging roller 2 may be reversed in charging polarity and may not be moved to the surface of the photosensitive drum 1. In the present embodiment, during cleaning, the voltage applied to the charging roller 2 is OFF (0 V) and the absolute value of the potential difference between the surface of the charging roller 2 and the surface of the photosensitive drum 1 is about 450 V.

When the voltage applied to the charging roller 2 is changed as described above, the cleaning of the charging roller 2 having the toner on the surface thereof is started. That is, the positively charged toner on the surface of the charging roller 2 starts to move to the surface of the photosensitive drum 1 by the action of the electric field. As the photosensitive drum 1 rotates, the toner moved to the surface of the photosensitive drum 1 is conveyed through the location facing the developing roller 41 to the primary transfer portion N1. Since the photosensitive drum 1 and the developing roller 41 are in a separated state at this point, the toner on the surface of the photosensitive drum 1 is not collected onto the developing roller 41. Then at the primary transfer portion N1, the positively charged toner on the surface of the photosensitive drum 1 is moved to the surface of the intermediate transfer belt 5 by the action of the electric field.

As the intermediate transfer belt 5 moves, the toner moved to the surface of the intermediate transfer belt 5 is conveyed through the secondary transfer portion N2 to the location facing the belt cleaning device 11 and collected by the belt cleaning device 11. Since a voltage of the same polarity (positive in the present embodiment) as the charging polarity of the toner on the surface of the intermediate transfer belt 5 is applied to the secondary transfer roller 9 at this point, the toner on the surface of the intermediate transfer belt 5 is less likely to adhere to the surface of the secondary transfer roller 9.

After the trailing end of the toner discharged from the charging roller 2 by the cleaning passes through the secondary transfer portion N2, the voltages applied to the primary transfer roller 8 and the secondary transfer roller 9 are turned OFF (changed to 0 V). This terminates the cleaning and the collection of the toner discharged from the charging roller 2 by the cleaning. In the present embodiment, the trailing end of the toner discharged from the charging roller 2 by the cleaning is the trailing end of the toner discharged from the surface of the charging roller 2Y of the first image forming unit SY located on the most upstream side in the direction of travel of the surface of the intermediate transfer belt 5. Note that the cleaning ends when the cleaning time Tc (described below) elapses.

The cleaning in the post-rotation step is executed as described above. After completion of the cleaning, other post-processing is executed and the job ends.

In the present embodiment, the image forming apparatus 100 can execute cleaning not only in the post-rotation step of each job, but also in an inter-sheet step in the middle of the job. When cleaning is executed in the middle of the job, the interval between the last image before the cleaning and the first image after the cleaning (interval between sheets) is made greater than the interval between the preceding and succeeding images (interval between sheets) in normal continuous image formation to execute the cleaning in the inter-sheet step. The cleaning in the inter-sheet step in the middle of the job is executed when an index value relating to the amount of toner adhering to the charging roller 2 exceeds a predetermined threshold Nth. Therefore, for example, even in the case of a job that forms a high-density image or deals with a large number of sheets subjected to image formation, it is possible to prevent a situation where an excessive amount of toner accumulates on the surface of the charging roller 2 and this has an unignorable impact on the charging capability.

In the present embodiment, as the index value relating to the amount of toner adhering to the charging roller 2, the number of sheets subjected to image formation after completion of the previous cleaning is used. This number is counted by the sheet counter 30. In the present embodiment, the predetermined threshold Nth is 100. That is, in the present embodiment, when the number of sheets subjected to image formation after completion of the previous cleaning exceeds "100" in the middle of the job, the image forming apparatus 100 interrupts the image formation in the middle of the job and executes cleaning in the inter-sheet step. After completion of the cleaning, the image forming apparatus 100 starts the remaining image formation in the job.

The "cleaning time Tc" described above is the period of time elapsed from the start of formation of an electric field for moving the toner from the charging roller 2 to the photosensitive drum 1, to the end of a time period that is preset to allow the toner to be fully moved from the charging roller 2 to the photosensitive drum 1. In the present embodiment, formation of the electric field for moving the toner from the charging roller 2 to the photosensitive drum 1 starts then a voltage applied to the charging roller 2 is turned OFF.

In the present embodiment, the relationship between the number of sheets subjected to image formation and the time (referred to as "required cleaning time" here) required to fully move the toner adhering to the charging roller 2 to the photosensitive drum 1 during the image formation is experimentally determined in advance. Then, in the present embodiment, the cleaning time Tc is determined on the basis of this relationship. The cleaning time Tc is set to 15 seconds in the present embodiment.

In the present embodiment, for use in interrupt processing during cleaning (described below), information, representing the relationship between the number of sheets subjected to image formation and the required cleaning time is stored in the form of a data table in the memory (ROM) 152.

6. Interrupt Processing During Cleaning

Interrupt processing during cleaning in the present embodiment will now be described. In the present embodiment, interrupt processing during cleaning is executed in common in all the image forming units S.

In the present embodiment, as described above, the control unit 150 can execute cleaning which involves moving toner adhering to the charging roller 2 from the charging roller 2 to the photosensitive drum 1, not only in the post-rotation step at the end of a job but also in an inter-image step during execution of the job. In the present embodiment, the control unit 150 executes cleaning in the post-rotation step of each job. Then, in the present embodiment, when an instruction to start the next job is input during execution of the cleaning in the post-rotation step, the control unit 150 performs the following control operation. That is, the control unit 150 stops the cleaning during execution and starts the next job. At the same time, on the basis of information relating to the amount of cleaning executed before being stopped in the middle of execution, the control unit 150 adjusts the timing for executing the subsequent cleaning.

In the present embodiment, as described above, the image forming apparatus 100 includes a counting unit that performs counting to obtain an index value relating to the amount of toner adhering to the charging roller 2. In the present embodiment, the counting unit is the sheet counter 30 that counts the number of sheets subjected to image formation, and the index value is the number of images formed after execution of the previous cleaning. In the present embodiment, the control unit 150 is configured to execute cleaning in an inter-image step when the number of sheets subjected to image formation (referred to as "sheet count value" here) counted by the sheet counter 30, that is, an index value obtained as a result of counting by the counting unit, exceeds the predetermined threshold Nth. In this configuration, when stopping the cleaning in the post-rotation step in the middle of execution, the control unit 150 corrects the sheet count value on the basis of information relating to the amount of cleaning executed before being stopped in the middle of execution. More specifically, in the present embodiment, the control unit 150 makes the correction by subtracting, from the sheet count value, a correction value corresponding to the amount of cleaning executed before being stopped in the middle of execution. In the present embodiment, the information relating to the amount of cleaning executed before being stopped in the middle of the execution is information relating to the time during which cleaning has been executed before being stopped in the middle of the execution. A more detailed description is given below.

In the present embodiment, when an instruction to start the next job is input during cleaning executed in the post-rotation step of each job, the control unit 150 stops the cleaning in the middle and executes interrupt processing to execute the next job. In the interrupt processing, the control unit 150 determines a correction value on the basis of the time during which the cleaning has been executed before being stopped in the middle, and corrects a sheet count value after completion of the previous cleaning on the basis of the correction value. Specifically, the control unit 150 refers to a data table stored in the memory (ROM) 152 and showing the relationship between the number of sheets subjected to image formation and the required cleaning time, and determines, as the correction value, the number of sheets subjected to image formation corresponding to the time during which the cleaning has been executed before being stopped in the middle. Then, the control unit 150 subtracts the determined correction value from the sheet count value after completion of the previous cleaning.

Figure 4:
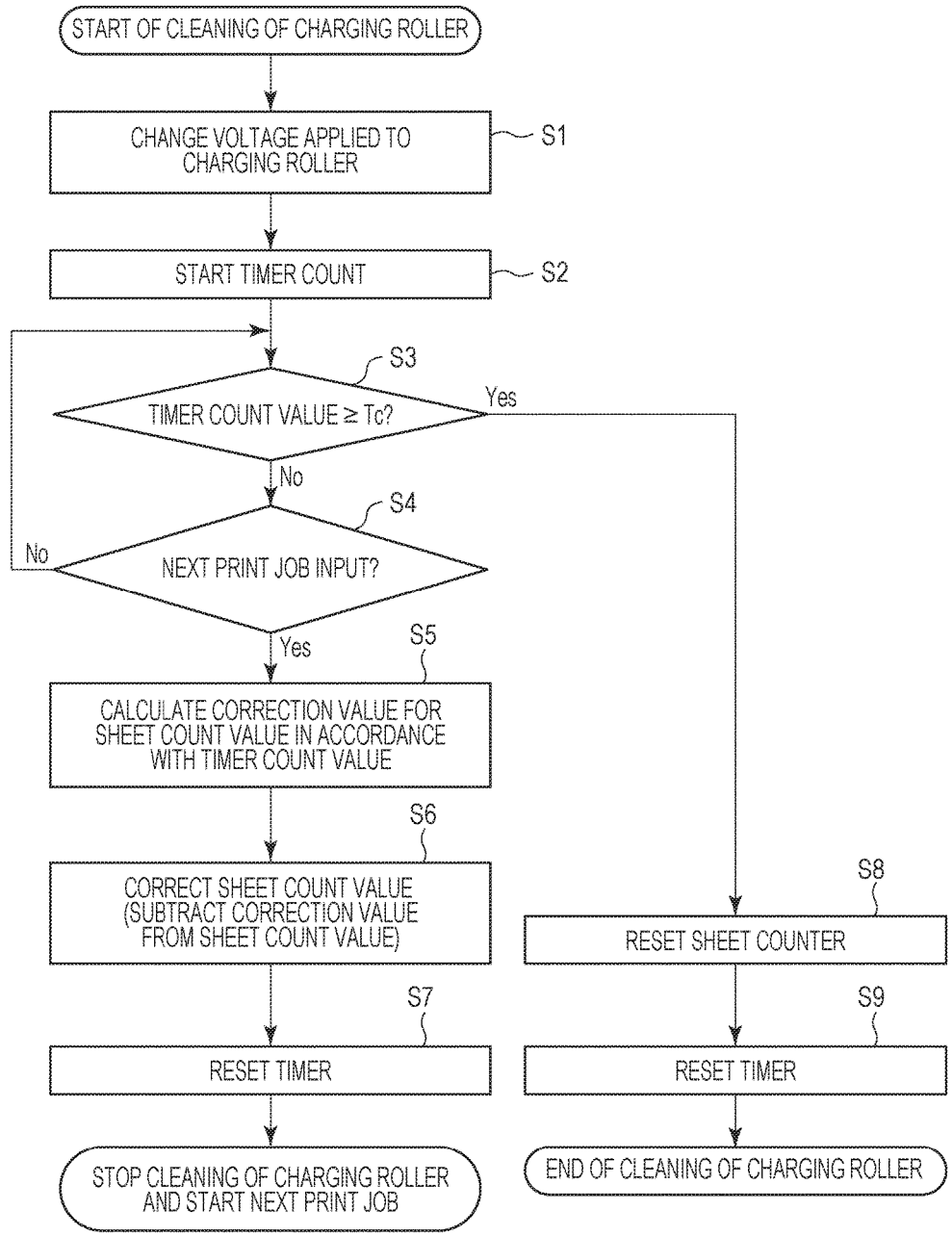
FIG. 4 is a flowchart illustrating interrupt processing during cleaning.

FIG. 4 is a flowchart illustrating a general procedure of interrupt processing executed during cleaning according to the present embodiment. The interrupt processing is executed by the control unit 150 by controlling the operation of each part of the image forming apparatus 100 in accordance with the procedure illustrated in FIG. 4. In the present embodiment, the procedure illustrated in FIG. 4 is started upon start of cleaning in the post-rotation step of the job.

First, when a voltage applied to the charging roller 2 is changed to a setting for cleaning (i.e., turned OFF in the present embodiment) and cleaning of the charging roller 2 having the toner on the surface thereof is started (step S1), the control unit 150 causes the timer 31 to start time counting (step S2). Next, the control unit 150 compares the count value of the timer 31 (also referred to as "timer count value" here) with the cleaning time Tc (Tc=15 seconds in the present embodiment) set in advance and determines whether the timer count value is greater than or equal to the cleaning time Tc (step S3).

If determining in step S3 that the timer count value is greater than or equal to the cleaning time Tc (YES in step S3), the control unit 150 resets the sheet count value to an initial value ("0" in the present embodiment) (step S8). Additionally, the control unit 150 resets the timer count value to an initial value ("0" in the present embodiment) (step S9). Then, the control unit 150 terminates the cleaning.

If determining in step S3 that the timer count value is less than the cleaning time Tc (NO in step S3), the control unit 150 determines whether an instruction to start the next job has been input (step S4). If determining in step S4 that an instruction to start the next job has not been input (NO in step S4), the control unit 150 returns the process to step S3 and continues the cleaning. On the other hand, if determining in step S4 that an instruction to start the next job has been input (YES in step S4), the control unit 150 determines, as described above, a correction value for the sheet count value in accordance with the timer count value at this point (step S5). The control unit 150 then subtracts the correction value from the sheet count value to correct the sheet count value (step S6). That is, in the present embodiment, a correction value, which is the number of sheets subjected to image formation corresponding to the time during which cleaning has been executed, is subtracted from the sheet count value, which is the number of sheets subjected to image formation after completion of the previous cleaning. Next, the control unit 150 resets the timer count value to the initial value ("0" in the present embodiment) (step S7). The control unit 150 then stops the cleaning and starts the next job. Note that when the cleaning is stopped, other processing operations required for post-processing may be performed.

Thus, when an instruction to start the next job is input to the control unit 150 during cleaning executed in the post-rotation step of each job, performing the interrupt processing described above gives priority to execution of the next job. This reduces the waiting time before start of the next job. Also, performing this interrupt processing can delay the timing at which the sheet count value exceeds the predetermined threshold Nth and cleaning is forcibly executed in an inter-sheet step in the middle of the job. It is thus possible to increase the number of images that can be output per unit time in the job. As described above, in the present embodiment, it is possible to maintain productivity of image formation while executing cleaning to prevent accumulation of an excessive amount of toner on the charging roller 2.

7. Advantageous Effects

Advantageous effects of the present embodiment will be further described through comparison with comparative examples.

Configurations of Comparative Examples

Configurations of first and second comparative examples were prepared for comparison with the present embodiment. The configurations of the first and second comparative examples are substantially the same as that of the present embodiment unless otherwise described below. Note that in the first and second comparative examples, elements having functions or configurations corresponding to those of the first embodiment are denoted by the same reference numerals as those in the first embodiment.

In the first comparative example, interrupt processing is not executed even when an instruction to start the next job is input to the control unit 150 during cleaning executed in the post-rotation step of each job. That is, in the first comparative example, the next job is executed after cleaning in the post-rotation step is performed for the predetermined period of cleaning time Tc.

In the second comparative example, when an instruction to start the next job is input to the control unit 150 during cleaning executed in the post-rotation step of each job, the control unit 150 executes interrupt processing to execute the next job. In the second comparative example, however, the interrupt processing only involves stopping the cleaning in the post-rotation step in the middle to execute the next job, and does not involve correcting the sheet count value on the basis of the time during which the cleaning has been executed before being stopped in the middle. That is, in the second comparative example, the cleaning that is stopped in the middle is treated as not having been executed at all.

Evaluation Experiment

For the first embodiment and the first and second comparative examples, an experiment was performed to evaluate differences in time required for job completion and changes in the charging capability of the charging roller 2 when jobs, each involving image formation on a relatively large number of sheets, were continuously input. In this experiment, a job for continuously printing a horizontally-striped image with an image ratio of 20% on 60 A4 recording sheets was input three times to the image forming apparatus 100. The second and third jobs were each input during cleaning in the post-rotation step of the previous job (six seconds after the start of the cleaning). For evaluation of the impact of re-transfer, printing was performed with two colors, magenta and cyan, in this experiment.

Of the image forming units SM and SC for magenta and cyan, the image forming unit SC for cyan is disposed on the downstream side. Changes in the charging capability of the charging roller 2C in the image forming unit SC for cyan were evaluated. The evaluation was made using a difference $\Delta V$ in the surface potential of the photosensitive drum 1 when, before and after execution of each of the three jobs described above, a predetermined voltage was applied to the charging roller 2 to uniformly charge the surface of the photosensitive drum 1. In this experiment, a direct-current voltage of about $-1000$ V was applied to the charging roller 2 and if the difference $\Delta V$ in surface potential was 10 V or less, it was determined that there was little impact on the charging capability. This experiment was all carried out in an environment of 23° C. and 50% relative humidity (RH).

Evaluation Result

First, a result of evaluation of changes in the charging capability of the charging roller 2 will be described.

In the first embodiment and the first and second comparative examples, the difference $\Delta V$ in surface potential was 10 V or less. That is, changes in the charging capability of the charging roller 2C for cyan had little impact and cleaning was effectively done.

Figure 5:
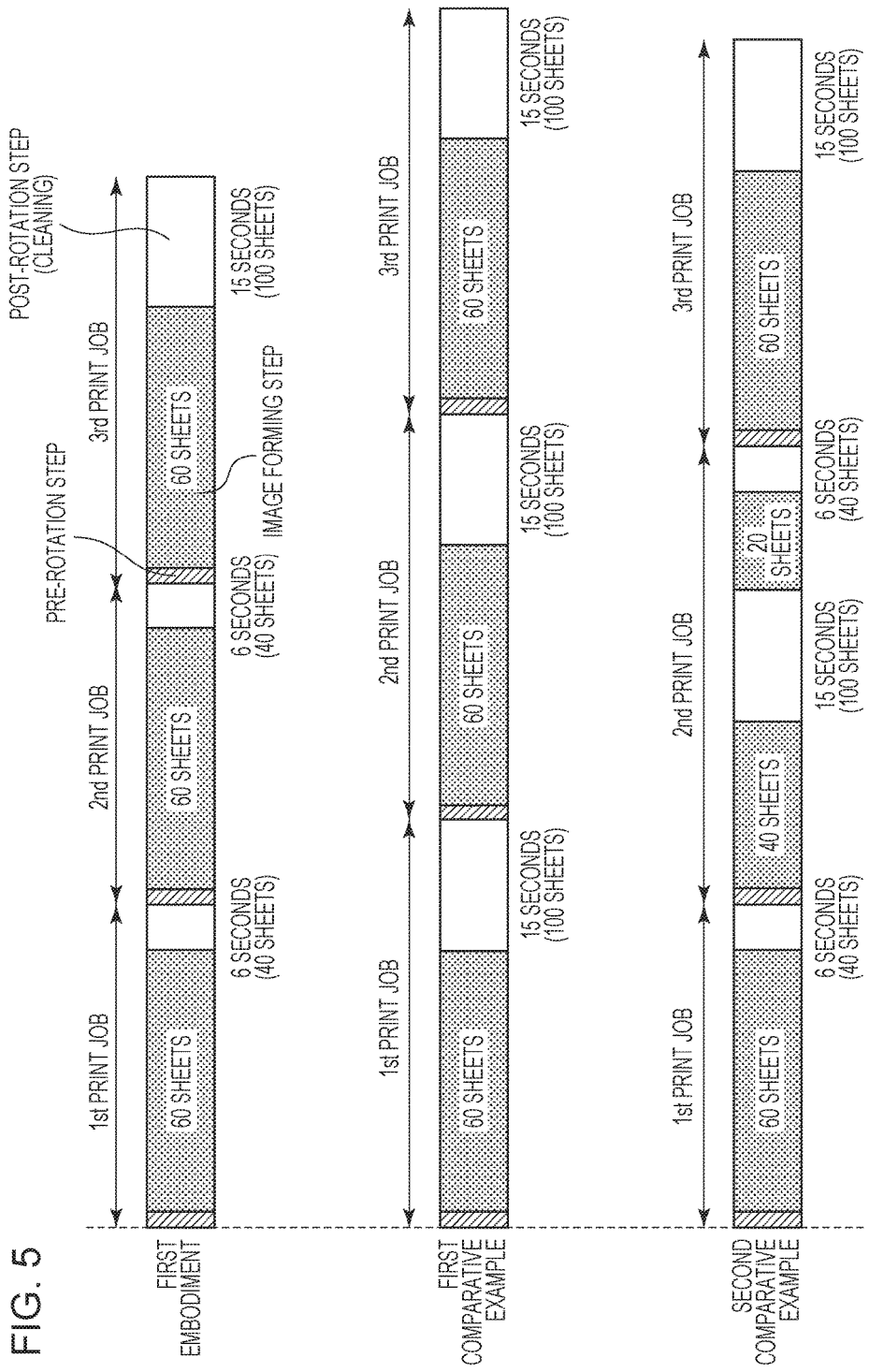
FIG. 5 is a diagram for explaining the length of time required for job completion in a first embodiment and first and second comparative examples.

Next, a result of evaluation of differences in time required for job completion will be described. FIG. 5 is a diagram illustrating the length of time required for job completion in the first embodiment and the first and second comparative examples.

In the first comparative example, even when an instruction to start the next job is input during cleaning in the post-rotation step, the next job is not executed until the cleaning is performed for the predetermined period of cleaning time Tc. In contrast, in the second comparative example, when an instruction to start the next job is input during cleaning in the post-rotation step, execution of the next job is given priority. Therefore, in the second comparative example, the second job starts earlier than in the first comparative example. In the second comparative example, however, the cleaning stopped in the middle is treated as not having been executed at all. Therefore, in the second comparative example, the sheet count value, which is the number of sheets subjected to image formation after completion of the previous cleaning, exceeds the predetermined threshold Nth (100 sheets in the present embodiment and the first and second comparative examples) in the middle of the second job. This interrupts the image formation and leads to forcible execution of cleaning in an inter-sheet step. Then, after completion of the cleaning in the inter-sheet step, the remaining image formation is started. Thus, in the second comparative example, although the second job starts earlier than in the first comparative example, the timing for execution of cleaning in the middle of the job is not controlled. As a result, the length of time required to complete all jobs in the second comparative example is only about three seconds shorter than in the first comparative example.

In the present embodiment, when an instruction to start the next job is input during cleaning in the post-rotation step, execution of the next job is given priority. Therefore, in the present embodiment, as in the second comparative example, the second job starts earlier than in the first comparative example. Additionally, in the present embodiment, a correction value, which is the number of sheets subjected to image formation corresponding to the time during which cleaning has been executed before being stopped in the middle, is subtracted from the sheet count value, which is the number of sheets subjected to image formation after completion of the previous cleaning. Therefore, in the present embodiment, it is possible to delay the timing at which the sheet count value exceeds the predetermined threshold Nth (100 sheets in the present embodiment and the first and second comparative examples) and cleaning is forcibly executed in an inter-sheet step in the middle of the job. The present experiment does not involve execution of cleaning in an inter-sheet step. Therefore, in the present embodiment, the length of time required to complete all jobs can be made at least 15 seconds shorter than in the first and second comparative examples.

As described above, in the present embodiment, it is possible to maintain productivity of image formation while executing cleaning to prevent accumulation of an excessive amount of toner on the charging roller 2. This effect is significant particularly when jobs, each involving image formation on a relatively large number of sheets, are input with some degree of continuity (particularly when an instruction to start the next job is input during cleaning in the post-rotation step).

Second Example Embodiment

A second example embodiment of the disclosure will now be described. The basic configuration and operation of the image forming apparatus of the present embodiment are the same as those of the first embodiment. Therefore, in the image forming apparatus of the present embodiment, elements having functions or configurations that are the same as, or correspond to, those of the image forming apparatus of the first embodiment are denoted by the same reference numerals as those in the first embodiment and their detailed description will be omitted.

In the present embodiment, when stopping the cleaning in the post-rotation step in the middle of execution, the control unit 150 corrects the threshold Nth on the basis of information relating to the amount of cleaning executed before being stopped in the middle of execution. More specifically, in the present embodiment, the control unit 150 makes the correction by adding, to the threshold Nth, a correction value corresponding to the amount of cleaning executed before being stopped in the middle of execution. In the present embodiment, the information relating to the amount of cleaning executed before being stopped in the middle of the execution is information relating to the time during which cleaning has been executed before being stopped in the middle of the execution. A more detailed description is given below.

In the present embodiment, as in the first embodiment, when an instruction to start the next job is input during cleaning executed in the post-rotation step of each job, the control unit 150 stops the cleaning in the middle and executes interrupt processing to execute the next job. In the present embodiment, in the interrupt processing, the control unit 150 determines a correction value on the basis of the time during which the cleaning has been executed before being stopped in the middle, and corrects the predetermined threshold Nth on the basis of this correction value. Specifically, the control unit 150 refers to a data table stored in the memory (ROM) 152 and showing the relationship between the number of sheets subjected to image formation and the required cleaning time and determines, as the correction value, the number of sheets subjected to image formation corresponding to the time during which the cleaning has been executed before being stopped in the middle. Then, the control unit 150 adds the determined correction value to the predetermined threshold Nth.

Figure 6:
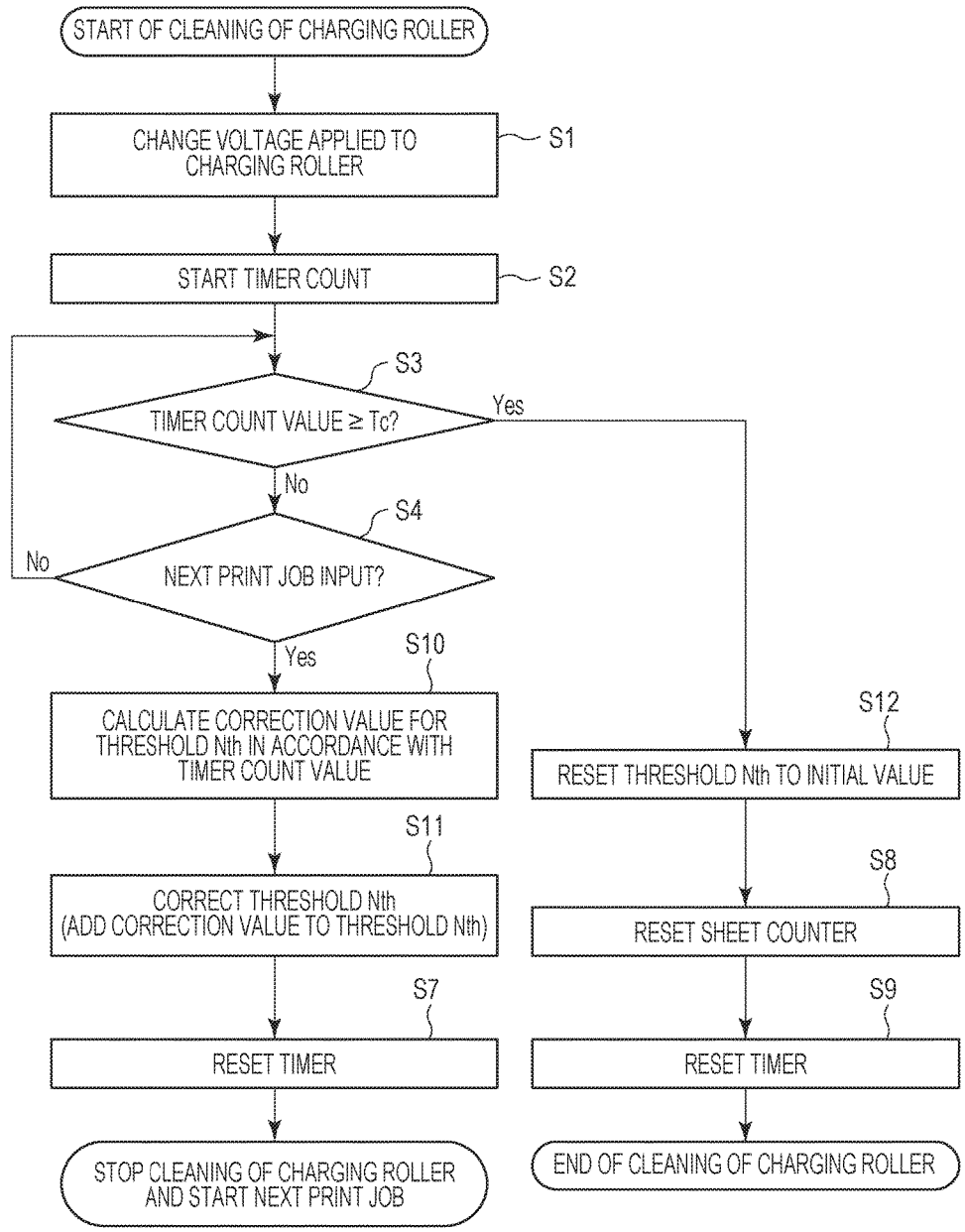
FIG. 6 is a flowchart illustrating another example of interrupt processing during cleaning.

FIG. 6 is a flowchart illustrating a general procedure of interrupt processing executed during cleaning according to the present embodiment. The interrupt processing is executed by the central unit 150 by controlling the operation of each part of the image forming apparatus 100 in accordance with the procedure illustrated in FIG. 6. In the interrupt processing of FIG. 6, the same steps as those of the interrupt processing of the first embodiment illustrated in FIG. 4 are denoted by the same step numbers as those in FIG. 4 and their detailed description will be omitted.

In the present embodiment, if determining in step S4 that an instruction to start the next job has been input (YES in step S4), the control unit 150 determines, as described above, a correction value for the predetermined threshold Nth in accordance with the timer count value at this point (step S). The control unit 150 then adds the correction value to the predetermined threshold Nth to correct the predetermined threshold Nth (step S11). That is, in the present embodiment, a correction value, which is the number of sheets subjected to image formation corresponding to the time during which cleaning has been executed, is added to the predetermined threshold Nth.

Also in the present embodiment, if determining in step S3 that the timer count value is greater than or equal to the cleaning time Tc (Tc=15 seconds in the present embodiment) (YES in step S3), the control unit 150 resets the predetermined threshold Nth to an initial value (100 sheets in the present embodiment) (step S12).

As in the first embodiment, changing the predetermined threshold Nth makes it possible to delay the timing at which the sheet count value exceeds the predetermined threshold Nth and cleaning is forcibly executed in an inter-sheet step in the middle of the job. The present embodiment can thus achieve the same advantageous effects as those in the first embodiment.

Others

Although the disclosure has been described in accordance with the embodiments, the disclosure is not limited to the embodiments described above.

In the embodiments described above, information relating to the time during which cleaning has been executed before being stopped in the middle of the execution is used as information relating to the amount of cleaning executed before being stopped in the middle of the execution. However, the disclosure is not limited to this. The amount of cleaning executed before being stopped in the middle, that is, any information correlating with the amount of toner moved from the charging member to the image bearing member can be used as information relating to the amount of cleaning executed before being stopped in the middle of the execution. For example, information relating to the number of times the charging member has rotated before cleaning is stopped in the middle may be used.

In the embodiments described above, the number of sheets subjected to image formation after completion of the previous cleaning is used as an index value relating to the amount of toner adhering to the charging member. However, the disclosure is not limited to this. Any index value correlating with the amount of toner adhering to the charging member may be used. For example, the value of accumulated information relating to the density of images formed after completion of the previous cleaning, and the value of accumulated information relating to the amount of use of the charging member (e.g., the number of rotations, rotation time, time taken for charging, or the number of rotations during the charging) after completion of the previous cleaning, may be used. For use of other index values, a threshold appropriate for each of them may be determined in advance.

Although the photosensitive member and the toner whose normal charging polarity is negative are used in the embodiments described above, the disclosure is not limited to this, and their normal charging polarity may be positive. When the normal charging polarity of the photosensitive member and the toner is positive, the polarity of a voltage applied to the charging member, the developing agent bearing member, and the like in the embodiments may need to be changed, as appropriate. Such a change can be easily made by those skilled in the art.

Although cleaning is executed in the post-rotation step of each job in the embodiments described above, the disclosure is not limited to this. Depending on how easily the charging member becomes contaminated with toner (which depends on, for example, the structure of the charging member), cleaning in the post-rotation step may be set to be executed at a predetermined frequency, such as once for multiple jobs. In the embodiments described above, the duration of execution of cleaning (cleaning time) in the post-rotation step stays the same unless an instruction to start the next job is input during cleaning, but the disclosure is not limited to this. The duration of execution of cleaning in the post-rotation step may be changed in accordance with the index value relating to the amount of toner adhering to the charging member. Similarly, the frequency and duration of execution of cleaning in an inter-sheet step may be changed in accordance with the index value relating to the amount of toner adhering to the charging member.

In the embodiments described above, the image forming apparatus is an electrophotographic image forming apparatus using an in-line intermediate transfer method, but the disclosure is not limited to this. The disclosure is applicable to any image forming apparatus using an electrophotographic method or an electrostatic recording method and including an image bearing member and a charging member configured to contact and charge the image bearing member. The electrophotographic image forming apparatus is an apparatus that forms an image on a recording material (recording medium) using an electrophotographic image forming process. Examples of the electrophotographic image forming apparatus include an electrophotographic copier, an electrophotographic printer (e.g., laser beam printer, light-emitting diode (LED) printer), a facsimile machine, a word processor, and a multifunction peripheral (multi-function printer) which combines the functions of these devices. The disclosure is also applicable to a direct-transfer image forming apparatus including a recording material bearing member (instead of the intermediate transfer member described above) and configured to directly transfer toner images formed by respective image forming units onto a recording material serving as a receiving member held and conveyed on the recording material bearing member. This image forming apparatus may include, as the recording material bearing member, an endless belt similar to the intermediate transfer belt, and may also include a cleaning device for removing the toner from the recording material bearing member. A recording material onto which a toner image is transferred from the image bearing member is thus held and conveyed by the recording material bearing member serving as another image bearing member. In this case, toner discharged from the charging member by cleaning and transferred onto the recording material bearing member collected by the cleaning device specifically designed for the recording material bearing member. In the embodiments described above, the photosensitive drum, the charging roller, and the developing device are combined together to form a process cartridge, but the disclosure is not limited to this. For example, the photosensitive drum and the developing device may be combined together to form a process cartridge, or the developing device may be a developing cartridge which is independently detachable from the apparatus main body of the image forming apparatus. Also, for example, a toner container containing toner therein may be a toner cartridge independently detachable from the apparatus main body of the image forming apparatus and configured to supply toner to the developing device mounted on the apparatus main body. The apparatus main body of the image forming apparatus is a part of the image forming apparatus, excluding the process cartridge, the developing cartridge, and the toner cartridge.

While the disclosure has been described with reference to example embodiments, it is to be understood. that the invention is not limited to the disclosed example embodiments. The scope of the following claims is to be accorded the broadest interpretation so as to encompass all such modifications and equivalent structures and functions.

This application claims the benefit of Japanese Patent Application No. 2017-138420 filed Jul. 14, 2017, which is hereby incorporated by reference herein in its entirety.

What is claimed is:

1. An image forming apparatus comprising:
an image bearing member configured to bear a toner image thereon;
a charging member configured to contact and charge the image bearing member;
a developing member configured to supply toner to the image bearing member; and
a control unit configured to execute cleaning involving moving the toner adhering to the charging member from the charging member to the image bearing member,
wherein when an instruction to start the next job is input during execution of the cleaning, the control unit stops the cleaning, starts the next job, and controls timing for executing the next cleaning on the basis of information relating to the cleaning executed before being stopped.

2. The image forming apparatus according to claim 1, further comprising a counting unit configured to perform counting to obtain an index value relating to the amount of the toner adhering to the charging member,
wherein if the index value obtained as a result of the counting by the control unit exceeds a predetermined threshold, the control unit executes the cleaning in an inter-image step; and
when stopping the cleaning in the middle of execution, the control unit corrects the obtained index value on the basis of the information relating to the cleaning executed before being stopped.

3. The image forming apparatus according to claim 2, wherein the control unit makes the correction by subtracting, from the obtained index value, a correction value based on the information relating to the cleaning executed before being stopped.

4. The image forming apparatus according to claim 1, further comprising a counting unit configured to perform counting to obtain an index value relating to the amount of the toner adhering to the charging member,
  wherein if the index value obtained as a result of the counting by the control unit exceeds a predetermined threshold, the control unit executes the cleaning in an inter-image step; and
  when stopping the cleaning in the middle of execution, the control unit corrects the threshold on the basis of the information relating to the cleaning executed before being stopped.

5. The image forming apparatus according to claim 4, wherein the control unit makes the correction by adding, to the threshold, a correction value based on the information relating to the cleaning executed before being stopped.

6. The image forming apparatus according to claim 1, wherein the information relating to the cleaning executed before being stopped is information relating to time during which the cleaning has been executed before being stopped.

7. The image forming apparatus according to claim 2, wherein the index value is the number of images formed after execution of the previous cleaning.

8. The image forming apparatus according to claim 1, wherein the control unit executes the cleaning in a post-rotation step of a job.

9. The image forming apparatus according to claim 1, wherein the toner moved from the charging member to the image bearing member in the cleaning is collected by the developing member.

10. The image forming apparatus according to claim 1, wherein the toner moved from the charging member to the image bearing member in the cleaning is transferred from the image bearing member to a receiving member and collected by a cleaning device configured to remove the toner on the receiving member.

11. The image forming apparatus according to claim 1, wherein toner remaining on the image bearing member after the toner image is transferred from the image bearing member to a receiving member can be collected by the developing member.

12. The image forming apparatus according to claim 1, wherein the toner is a one-component developing agent.

* * * * *